No. 613,088. Patented Oct. 25, 1898.
A. V. SPANG.
POLE SUPPORT FOR VEHICLE RUNNING GEAR.
(Application filed Apr. 21, 1898.)
(No Model.)
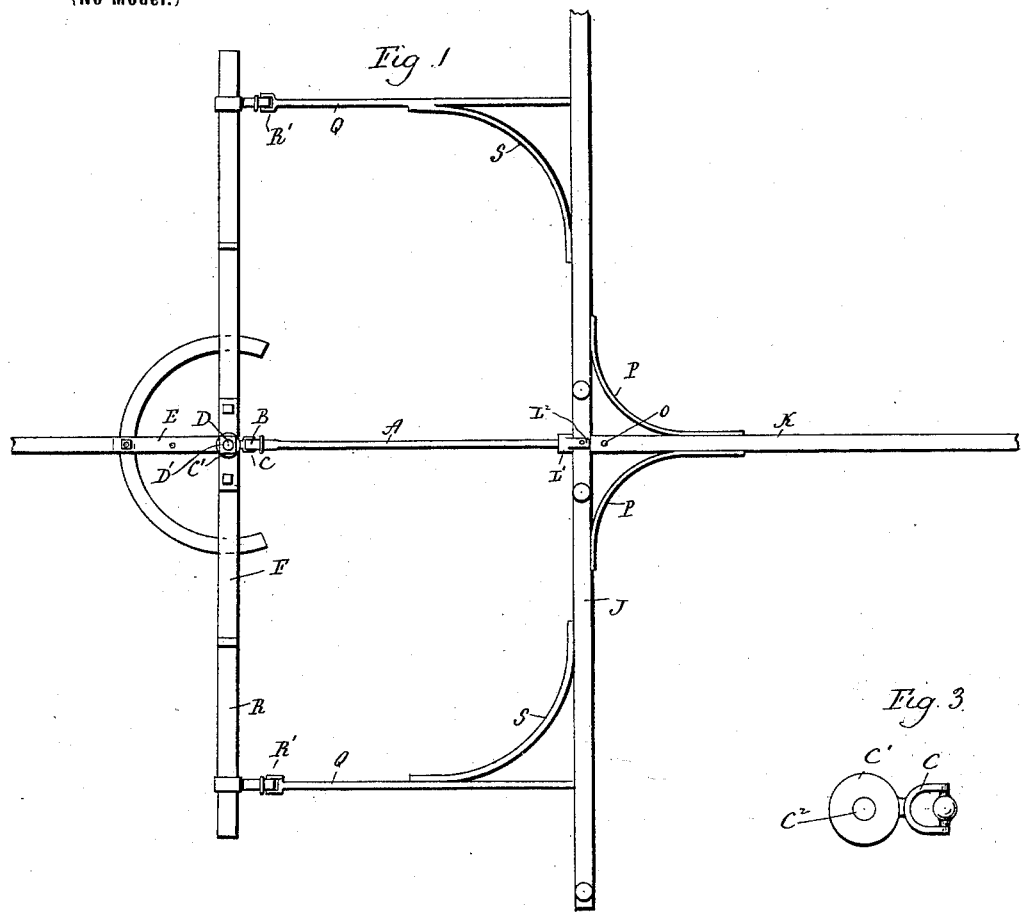
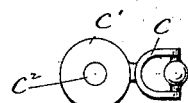
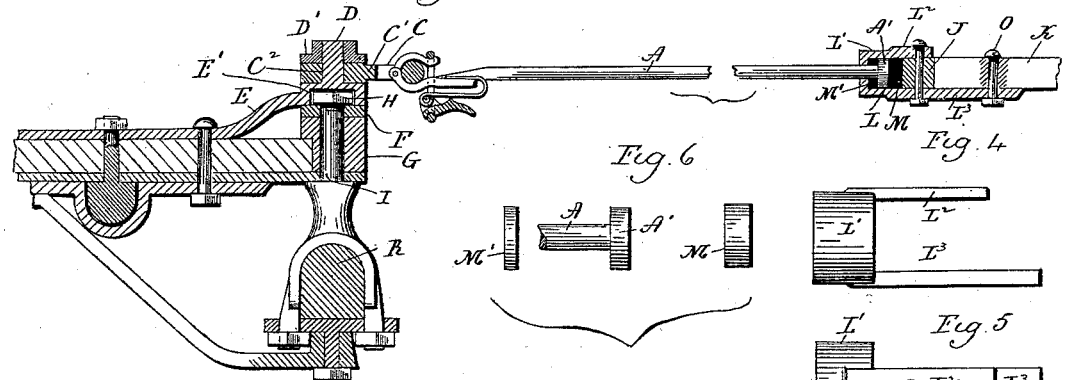

United States Patent Office.

ANTHONY V. SPANG, OF NEW HAVEN, CONNECTICUT.

POLE-SUPPORT FOR VEHICLE RUNNING-GEAR.

SPECIFICATION forming part of Letters Patent No. 613,088, dated October 25, 1898.

Application filed April 21, 1898. Serial No. 678,368. (No model.)

*To all whom it may concern:*

Be it known that I, ANTHONY V. SPANG, of New Haven, in the county of New Haven and State of Connecticut, have invented a new Improvement in Pole-Supports for the Running-Gear of Vehicles; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a running-gear constructed in accordance with my invention; Fig. 2, an enlarged view thereof in vertical central section; Fig. 3, a detached plan view of the coupling-plate by means of which the rear end of the pole-support is connected with the auxiliary stud of the running-gear; Fig. 4, a detached view, in side elevation, of the coupling-head by means of which the forward end of the pole-support is connected with the draw-bar and the pole; Fig. 5, a plan view of the said coupling-head; Fig. 6, a detail view showing the plunger at the forward end of the pole-support and the two cushions between which the said plunger is located.

My invention relates to an improvement in pole-supports for the running-gear of vehicles, the object being to provide a device of simple, durable, and effective construction, composed of few parts, and not liable to derangement.

With these ends in view my invention consists in certain details of construction and combination of parts, as will be hereinafter described, and pointed out in the claims.

In carrying out my invention as herein shown I employ a pole-support A, consisting of a rod or bar of iron or steel provided at its rear end with a coupling device B, which may be of any suitable construction and by means of which it is detachably connected with the forwardly-projecting stirrup C of a disk-shaped coupling-plate C', having a central perforation C², adapting it to be set down over a heavy upwardly-projecting stud D in the nature of a supplementary or auxiliary king-bolt, the upper end of this stud being threaded for the reception of a nut D', which bears down upon the upper face of the plate C' and maintains it in position on the stud D. The said stud is formed integral with or secured to the spring-plate E, by means of which the spring F is secured to the head-block G. The said spring-plate is also formed at a point directly under the stud D with a recess E', which receives a nut H and the threaded upper end of the king-bolt I, to which the said nut is applied in the usual manner. The forward end of the pole-support A is connected with the center of the draw-bar J and the rear end of the pole K. This connection may be made in a variety of ways. As herein shown, the forward end of the pole is formed with a plunger A', which is located in a chamber L, formed in a coupling-head L', having a forwardly-projecting upper coupling-plate L² and a longer forwardly-projecting lower coupling-plate L³. Within the chamber L, I locate two rubber buffers M and M', respectively located on opposite sides of the plunger A' and cushioning the rearward pull and forward thrust thereof. The draw-bar J is received between the plates L² and L³, to which it is secured by means of a bolt N, while the pole K is secured to the longer supporting-plate L³ by means of a bolt O. The means just described for connecting the forward end of the pole-support with the pole may, however, be varied as found desirable or expedient. The rear end of the pole is also connected with the draw-bar by means of two braces P P, while the ends of the draw-bar are connected by side bars or hounds Q Q with the respective ends of the axle R, the connection between the rear ends of the hounds Q and the axle R being made by flexible couplings R' R' of any approved construction. Braces S S reinforce the connection between the forward ends of the hounds Q and the ends of the draw-bar J.

By means of my improved pole-support I establish direct draft connection between the rear end of the pole and the running-gear proper through the auxiliary stud formed upon the spring-plate and relieving the king-bolt of much of the strain which would otherwise be imposed upon it. It will be understood from the foregoing that my improvement is of a simple character and very convenient to use, the construction of the pole-support and its end connections making it easy to attach and remove.

In view of the changes suggested and of others which may obviously be made I would have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. In a running-gear for vehicles, the combination with the axle and draw-bar thereof, means for connecting the ends of the draw-bar with the axle, a pole, and a pole-support connected at its forward end with the central portion of the draw-bar and the rear end of the pole, and at its rear end with the running-gear at a point directly above the king-bolt thereof.

2. In a running-gear for vehicles, the combination with the axle and draw-bar thereof, of means for connecting the ends of the draw-bar with the ends of the axle, a pole connected at its rear end with the draw-bar, and a pole-support connected at its forward end with the central portion of the draw-bar and with the rear end of the pole and connected at its rear end with an auxiliary stud located directly above the king-bolt of the running-gear and carried by the spring-plate thereof.

3. In a running-gear for vehicles, the combination with the axle and draw-bar thereof, of means for connecting the said axle and draw-bar, a pole connected with the draw-bar, an independently-formed pole-support extending between the draw-bar and axle, and connected at its forward end with the rear end of the pole and with the middle portion of the draw-bar, an auxiliary stud located directly above the king-bolt of the running-gear proper and carried by the spring-plate thereof, and a coupling-plate applied to the said auxiliary stud and connected with the rear end of the independently-formed pole-support.

4. In a running-gear for vehicles, the combination with the axle and draw-bar thereof, of means for connecting the axle and draw-bar, a pole connected with the central portion of the draw-bar, a pole-support consisting of a rod or bar extending between the draw-bar and the running-gear, means for connecting the rear end of the said pole-support with the running-gear at a point directly over the king-bolt thereof, and a coupling-head receiving the forward end of the pole-support which plays back and forth in it under the restraint of cushions and which is adapted for attachment to the draw-bar and to have the rear end of the pole attached to it.

5. In a running-gear for vehicles, the combination with the axle and draw-bar thereof, means for connecting the ends of the draw-bar with the ends of the axle, a pole, and an independently-formed pole-support connected at its forward end with the rear end of the pole and the middle portion of the draw-bar, and extending thence directly rearward in line with the pole, and connected at its rear end with the running-gear proper at a point midway the length of the axle.

In testimony whereof I have signed this specification in the presence of two subscribing witnesses.

ANTHONY V. SPANG.

Witnesses:
GEORGE D. SEYMOUR,
FRED. C. EARLE.